500,239

United States Patent Office 3,429,724
Patented Feb. 25, 1969

3,429,724
CEMENT SET RETARDING COMPOSITION
John C. Keenum, Jr., Odenton, and Richard L. Angstadt, Silver Spring, Md., assignors to W. R. Grace & Co., New York, N.Y., a corporation of Connecticut
No Drawing. Filed Oct. 21, 1965, Ser. No. 500,239
U.S. Cl. 106—89     5 Claims
Int. Cl. C04b 7/56, 7/00

ABSTRACT OF THE DISCLOSURE

A process for retarding the setting time of portland cement by adding from 0.1 to 5 weight percent zinc chloride or zinc nitrate.

---

This application relates to cement compositions having retarded hardening rates and to methods for making these compositions.

In summary, the process of this invention is a method for producing cement mixtures having reduced hardening rates comprising adding to an alite cement from about 0.1 to 5 percent of a zinc salt, based on the dry weight of the alite cement, and intimately mixing the ingredients to provide a uniform distribution of the zinc salt throughout the cement.

In summary, the process of this invention is a method for reducing the rate of hardening alite cements comprising mixing an alite cement, water, and from 0.1 to 5 percent of a zinc salt based on the dry weight of the cement binder, and allowing the mixture to harden.

In summary, the composition of this invention comprises an alite cement containing from about 0.1 to 5 percent of a zinc salt, based on the dry weight of the cement binder.

In many of the uses of alite cements, of which portland cement and mortars and concretes containing portland cement are the most common examples, it is desirable to retard the rate of hardening thereof. The retardation gained using zinc salts is useful in placing alite cement mortars and concretes in hot weather when ambient conditions tend to accelerate the hardening rate. In general, under both hot and cold ambient conditions, the use of zinc salts as a retarder will effect an extension of the time available for mixing and placing such materials. In the process for cementing oil wells, the cement must remain sufficiently fluid to be pumped into the well without the use of high pump pressures and agitation of partially set cements.

It is the object of this invention to provide a method for retarding the hardening rate of alite cements with a zinc salt retarder.

It is another object of this invention to provide alite cements having a retarded rate of hardening but without significantly decreasing the final compressive strength of the set product.

The binder component in the cements, mortars and concretes used widely as a construction material is portland cement. Portland cement is manufactured by calcining a mixture of limestone and clay to form a clinker, and by grinding the clinker to a fine powder with gypsum. The major compounds found in portland cement clinker are tricalcium silicate, dicalcium silicate, tricalcium aluminate and tetracalcium aluminoferrite. The tricalcium and dicalcium silicate are thought to be the principal bonding constituent in the portland cement. Tricalcium silicate when mixed with water forms a calcium silicate hydrate known as tobermorite gel and calcium hydroxide. The dicalcium silicate when contacted with water forms similar products but at a much lower rate of reaction. The tricalcium silicate, having the greater rate of reaction determines, to a large extent, the hardening rate of the cement. To provide materials which are suitable for different uses, portland cements having a range of hardening rates have been found desirable. By producing cements having a range of proportions of tricalcium silicate present, a range of hardening rates has been obtained. Four general types of portland cements, varying principally in the relative quantities of tricalcium silicate and dicalcium silicate present therein, are commonly produced. The proportions of the principal compounds present in each type of cement are shown in Table I.

TABLE I

| Cement type | I | II | III | IV |
|---|---|---|---|---|
| Composition, wt. percent: | | | | |
| Tricalcium silicate | 53 | 47 | 58 | 26 |
| Dicalcium silicate | 24 | 32 | 16 | 54 |
| Tricalcium aluminate | 8 | 3 | 8 | 2 |
| Tetracalcium aluminoferrite | 8 | 12 | 8 | 12 |

The term "alite cement" as employed herein is defined as including neat pastes, mortars, and concretes and the mixed, dry, unreacted ingredients of neat pastes, mortars, and concretes, comprising as alite cement binder, a composition containing greater than 20 percent tricalcium silicate, based on the dry weight of the composition. The most common alite cements are portland cements, and mortars and concretes containing portland cements. Most commercially available alite cements contain binders comprising from about 20 to 75 percent tricalcium silicate. The alite cement binder, or cement binder is the component which provides the desired bonding, for example, portland cement.

A wide range of the hardening rates can be obtained by producing cement having varying quantities of tricalcium silicate such as are shown in Table I. However, the particular proportion of the cement ingredients and the rate of hardening obtained is limited by the types of raw materials from which the cement is produced. As a result, for some uses even the Type IV cement does not harden at a desired slow rate.

Retarders are employed to meet these requirements. Retarders are compositions which have been found to decrease the initial rate of hardening of a cement. Alite cement retarders must not significantly decrease the final compressive strength of the hardened cement, and zinc salts meet this requirement.

Zinc salts which have been found to be suitable as alite cement hardening rate retarders include zinc chloride, zinc sulfate, zinc nitrate, zinc acetate, etc. and mixtures thereof. Retardation of alite cements with zinc salts can be obtained with from about 0.1 to 5 percent and preferably from about 0.2 to 0.5 percent of the zinc salt based on the weight of the cement binder. Concentrations of the zinc salts greater than about 5 percent increase retardation but also tend to dilute the cement binder and decrease the compressive strength of the product.

The zinc salts can be added to the alite cement by various techniques. Zinc salts can be added to portland cement binder clinker prior to grinding and can be thoroughly mixed with the cement component during the grinding step. The retarder can also be added to the alite cement powder as a dry powder, slurry, or water solution, and the ingredients can be thoroughly mixed to uniformly disperse the active ingredients. The zinc salts can be dissolved in the water with which the alite cement binder is mixed to form a hardening composition. The alite cement binder can be premixed with water and then mixed or contacted with the retarder. In general, the retarder can be added to the cement at any stage prior to its final hardening.

Our invention is further illustrated by the following specific, but non-limiting examples.

EXAMPLE 1

In this example varying concentrations of zinc sulfate were mixed with two different Type I portland cements. The zinc sulfate was added to the cement, dissolved in the mix water. A 0.40 water to cement ratio was used. The time of setting of the cements was determined by the ASTM method of test for time of setting of hydraulic cements by the Vicat Needle (ASTM C191–58). Three determinations were made for each additive, and the average value obtained is shown in Table A.

TABLE A

| Cement | $ZnSO_4$ concentration, wt. percent | Time of set, min. |
| --- | --- | --- |
| A | 0 | 341 |
| A | 0.10 | 355 |
| A | 0.25 | 618 |
| A | 0.50 | 700 |
| B | 0 | 331 |
| B | 0.10 | 324 |
| B | 0.25 | 652 |
| B | 0.50 | 762 |

As shown in Table A, the retardation obtained increases as the zinc sulfate concentration in the cement increases.

EXAMPLE 2

In this example several different zinc salts were mixed with a Type I portland cement. The zinc salts were added to the cement, and the cement composition was formed and tested by the procedure described in Example 1. The results obtained are shown in Table B.

TABLE B

| Retarder | | Time of set, min. |
| --- | --- | --- |
| Composition | Concentration, wt. percent | |
| Blank | 0 | 292 |
| Zinc acetate | 0.25 | 436 |
| Do | 0.50 | 685 |
| Zinc nitrate | 0.25 | 428 |
| Do | 0.50 | 686 |
| Zinc sulfate | 0.25 | 462 |

As shown in Table B, zinc acetate and zinc nitrate are also retarders for portland cement hardening, and as the concentrations of these additives are increased, an increased retardation effect is obtained. Zinc chloride exhibits a similar effect.

EXAMPLE 3

This example shows that the compressive strength of the portland cement product is not significantly changed by the use of zinc salts as retarders.

Zinc sulfate was added to a Type I portland cement as described in Example 1. Blanks and cement mixtures containing 0.25 wt. percent zinc sulfate were prepared for a 7 day compressive strength test. Other blanks and cement mixtures containing 0.50 wt. percent zinc sulfate were prepared for a 28 day compressive strength test. The ASTM method C109–58 for compressive strength was followed, and the results are shown in Table C.

TABLE C

| $ZnSO_4$ Conc., wt. percent | Compressive strength, p.s.i. | |
| --- | --- | --- |
| | 7 day | 28 day |
| 0 | 4,627±421 | |
| 0.25 | 4,338±421 | |
| 0 | | 5,065±111 |
| 0.25 | | 4,806±128 |

Obviously, many modifications and variations of the invention as hereinabove set forth may be made without departing from the essence and scope thereof, and only such limitations should be applied as are indicated in the appended claims.

We claim:
1. A process for producing a cement mixture having a retarded hardening rate comprising,
    (a) adding to a portland cement from about 0.1 to 5 percent of a zinc salt selected from the group consisting of zinc chloride, zinc nitrate, and mixtures thereof, based on the dry weight of the cement binder, and
    (b) thoroughly mixing the components of the mixture.
2. A process for producing a cement mixture having a retarded hardening rate comprising,
    (a) adding water and a zinc salt selected from the group consisting of zinc chloride, zinc nitrate, and mixtures thereof to a portland cement, the amount of zinc salt added being from about 0.1 to 5 percent of the dry weight of the portland cement binder, and
    (b) thoroughly mixing the components of the mixture.
3. A process for retarding the hardening rate of a portland cement comprising,
    (a) adding to said cement from about 0.1 to 5 percent of a zinc salt selected from the group consisting of zinc chloride, zinc nitrate, and mixtures thereof, based on the dry weight of the portland cement binder,
    (b) mixing the components to form a homogeneous mixture, and
    (c) adding water to the mixture.
4. A process for retarding the hardening rate of a portland cement comprising,
    (a) adding water to a portland cement to form a settable mixture, and
    (b) contacting the settable mixture with 0.1 to 5 percent, based on the dry weight of the cement of a zinc salt selected from the group consisting of zinc chloride, zinc nitrate, and mixtures thereof.
5. A cement composition consisting essentially of a portland cement and from about 0.1 to 6 percent of a zinc salt selected from the group consisting of zinc chloride, zinc nitrate, and mixtures thereof, based on the dry weight of the portland cement binder.

References Cited

UNITED STATES PATENTS

| | | | |
| --- | --- | --- | --- |
| 1,296,468 | 3/1919 | Blumenberg | 106—89 |
| 1,364,587 | 1/1921 | Sanders et al. | 106—97 |
| 1,994,438 | 3/1935 | Schulz | 106—90 |
| 2,822,873 | 2/1958 | Harmsen et al. | 106—89 |
| 2,857,286 | 10/1958 | Striker | 106—90 |
| 3,331,695 | 7/1967 | Angstadt | 106—89 |

TOBIAS LEVOW, *Primary Examiner.*

S. E. MOTT, *Assistant Examiner.*

U.S. Cl. X.R.

106—90, 315